United States Patent
Little

(10) Patent No.: US 11,913,424 B1
(45) Date of Patent: Feb. 27, 2024

(54) RIVER, OCEAN AND TIDAL CURRENT ENERGY PRODUCTION

(71) Applicant: James Curtis Little, Belfair, WA (US)

(72) Inventor: James Curtis Little, Belfair, WA (US)

(73) Assignee: James Curtis Little, Belfair, WA (US)

( * ) Notice: Subject to any disclaimer, the term of this patent is extended or adjusted under 35 U.S.C. 154(b) by 0 days.

(21) Appl. No.: 18/463,012

(22) Filed: Sep. 7, 2023

(51) Int. Cl.
*F03B 13/26* (2006.01)

(52) U.S. Cl.
CPC .......... *F03B 13/264* (2013.01); *F03B 13/262* (2013.01); *F05B 2220/7066* (2013.01); *F05B 2240/95* (2013.01); *F05B 2260/50* (2013.01)

(58) Field of Classification Search
CPC ................. F03B 13/264; F03B 13/262; F05B 2220/7066; F05B 2240/95; F05B 2260/50
See application file for complete search history.

(56) References Cited

U.S. PATENT DOCUMENTS

| | | | |
|---|---|---|---|
| 7,750,491 B2 | 7/2010 | Sankrithi | |
| 7,977,809 B2 | 7/2011 | Devaney | |
| 9,291,147 B2 | 3/2016 | Jones | |
| 9,732,724 B1 | 8/2017 | Burke | |
| 9,777,709 B2* | 10/2017 | Dysarsz | F03D 7/0224 |
| 2010/0283250 A1* | 11/2010 | Capone | F03B 17/066 416/8 |
| 2017/0138332 A1* | 5/2017 | Parente | B63B 35/44 |
| 2018/0023535 A1 | 1/2018 | Børgesen | |

* cited by examiner

*Primary Examiner* — Joseph Ortega
(74) *Attorney, Agent, or Firm* — Lee & Hayes, P.C.

(57) ABSTRACT

An apparatus is described for converting river, tidal or ocean current energy into another form of energy, such as electrical, mechanical, or chemical energy. The apparatus can include a first underwater sail(s) coupled to a first cable and second underwater sail(s) coupled to a second cable. The sails are configured to catch water flows and move their respective cables along pulleys. The first cable and the second cable can form a main cable loop that is coupled to a bull wheel. A second cable loop configures the sails to best catch the water flow. The pulleys can guide the main cable loop along a rotational direction. The rotational movement of the bullwheel can be transferred to a generator to convert the water flow into another form of energy.

21 Claims, 6 Drawing Sheets

RIVER, OCEAN AND TIDAL CURRENT ENERGY PRODUCTION

BACKGROUND

Renewable energy can provide for a number of benefits, such as environmental benefits, energy security, economic benefits, sustainability, improved public health, and reduced energy cost. Regarding environmental benefits, renewable energy sources (i.e., solar, wind, and hydropower) do not emit greenhouse gases or other pollutants when used, reduce the carbon footprint, and thereby mitigate the impacts of climate change. Regarding energy security, renewable energy can be generated from sources that are domestic and abundant, reducing dependence on foreign oil.

Regarding economic benefits, renewable energy technologies are becoming increasingly competitive with traditional fossil fuels, and can create jobs and economic growth in the renewable energy industry. Regarding sustainability, renewable energy is a sustainable energy source, as it can be continuously replenished and does not deplete finite resources like fossil fuels. Regarding improved public health, reducing dependence on fossil fuels reduces air pollution and its associated negative health effects. Regarding reduced energy costs, renewable energy sources can offer stable and predictable energy costs, as they are not subject to the price volatility of fossil fuels. Overall, the development and adoption of low impact renewable energy is critical for achieving a sustainable future and mitigating the impacts of climate change.

Tidal energy conversion, is the process of generating electricity from the kinetic energy of tidal and ocean current. Tidal energy conversion typically involves the use of turbines that are placed in areas where tidal currents are strong or in costly barriers and impoundments where tidal forces are corralled and concentrated. As the tide comes in and out, the turbines are turned by the force of the water, generating electricity in the process. The high flow rates needed for turbines can limit the number of useful sites they can be installed. Tidal energy is a promising source of renewable energy because rivers, tides and ocean currents are predictable and consistent with little variability over time, and because tidal energy has the potential to contribute significantly to global energy needs and help reduce our reliance on fossil fuels.

The challenge with tidal currents reside in the physical reality that they flow in opposite directions four or more times daily and though predictable, the rate of flow varies greatly through the ebb and flow of each tide. The additional challenge with this particular apparatus and system is that it must also tack back and forth during each ebb and flow. The other common challenge of tidal power is the difficulty of capturing a large cross section of the fluid flow. For turbines, this is the surface area of their rotors, an apparent limitation to their utility. For a hydrosail, as described in this patent, through simplicity and multiplicity, a much larger cross section can be harvested.

BRIEF DESCRIPTION OF THE DRAWINGS

The detailed description is described with reference to the accompanying figures. In the figures, the leftmost digit(s) of a reference number identifies the figure in which the reference number first appears.

DETAILED DESCRIPTION

Figure 1:
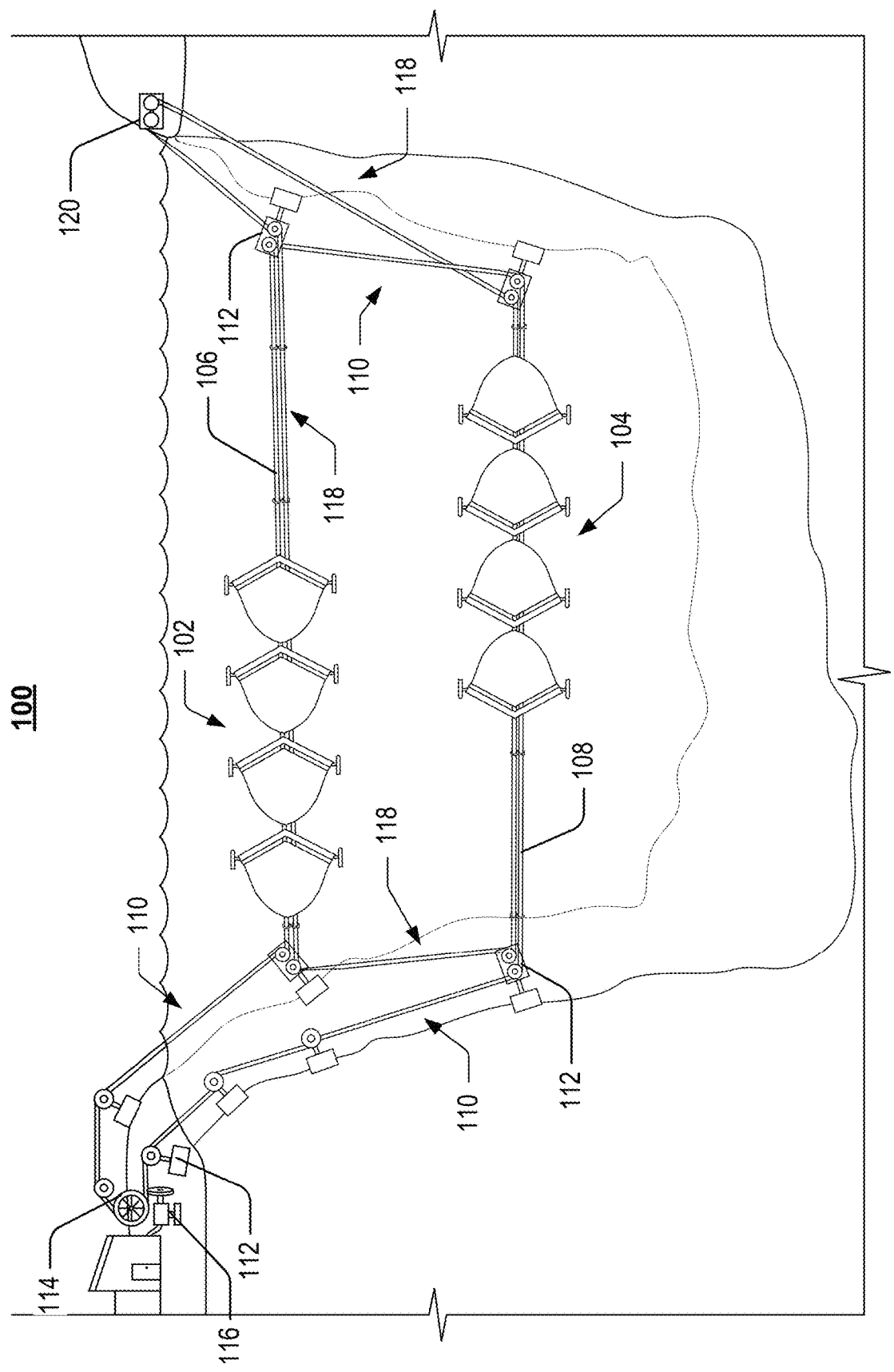
FIG. 1 illustrates a side view of an apparatus for converting tidal energy into electrical energy, the apparatus deployed in a channel in accordance with an example of the present disclosure. In this figure the fluid flow is coming out of the page toward the viewer.

Described herein are, among other things, techniques, devices, and systems for using one or more under water sails (sometimes referred to herein as "aqua sails") to generate electricity or other useful forms of energy as in mechanical (as in to drive a pump) or chemical (as in desalination or hydrogen gas production) from tidal and ocean currents. "Tidal energy," as used herein means kinetic energy of the tidal flow of water, river flow, and/or the ocean currents. The aqua sails described herein are large and kite-like, and are configured to be deployed underwater. The aqua sails described herein are configured to be coupled to cables, pulleys, and a bullwheel connected to a generator, which is used to convert the kinetic energy of the flow of water into electrical energy. The aqua sails work by using the force of the flowing water to propel the kite-like sail through the water, similar to how a traditional sail of a sailboat works with the wind. The aqua sail is coupled to a cable underwater, and as the aqua sail moves through the water due to the force of the flowing water, the aqua sail pulls on the cable, which is connected to the generator through a bullwheel(s) via one or more pulleys, causing the generator to generate electricity from the kinetic energy of the rotating bullwheel(s).

The aqua sails can be easily adjusted to take advantage of changing tidal currents, allowing for optimal energy production. Additionally, because they can be located near the surface of the water and in deeper waters (at least about 80 ft), they can be easily accessed for maintenance while avoiding boating and shipping vessels that may pass by above. The deployment of the aqua sails can avoid the impediments of site development, such as dams and tidal impoundments, the poor esthetics of wind and solar farms, the difficulty of repairs and maintenance of tidal turbines, and the destruction of wildlife.

This disclosure describes a tidal current energy conversion apparatus and systems that are a non-turbine, non-foil system that can be submerged below shipping vessels, and can be used in water flow currents from ½ to 9 knots or more to generate electrical energy.

Be it understood that in all of the following examples, while only a single sail may be described, the number of sails deployed can be as many as can logically be deployed on each cable system.

In some examples, the apparatus can include a first aqua sail that can be coupled to a first cable such that the first aqua sail can move the first cable in a first direction when the first aqua sail catches a fluid flow of the tidal current, and a second aqua sail that can be coupled to a second cable such that the second aqua sail can move the second cable in a second direction when the second aqua sail catches the tidal current flow. The first cable and the second cable can be respective portions of a single continuous main cable loop.

In some examples, a first pulley and a second pulley can be coupled to the first cable such that the first pulley and the second pulley guide the first cable in a first rotational direction as the first cable moves in the first direction. A third pulley and a fourth pulley can be coupled to the second cable such that the third pulley and the fourth pulley guide the second cable in a second rotational direction as the second cable moves in the second direction. These pulleys or multiples thereof are also incorporated to guide these cables and their sails below the water's surface. A bullwheel can be coupled to the main cable loop to turn the bullwheel in the first rotational direction and/or the second rotational direction. A generator can be coupled to the bullwheel to convert the kinetic energy of the bullwheel to another form of energy, such as electrical energy. A gear box and a ratchet system can convert the bidirectional motion of the bullwheel to unidirectional input to the generator.

In some examples, the apparatus can include a control cable loop that is coupled to the first pulley, the second pulley, the third pulley, the fourth pulley, being now complex pulleys, and a cable controller. In some examples, the cable controller can be configured to control the control cable loop to move around the cable controller, the first pulley, the second pulley, the third pulley, and the fourth pulley. In some examples, the first sail can be fixedly attached to the first cable and the control cable loop. In another example, the first sail can be coupled to a ring(s) that can slide along the length of the first cable, and a ring(s) that can slide along the length of the control cable loop. In some examples, the second sail can be fixedly attached to the second cable and the control cable loop. In another example, the second sail can be coupled to a ring(s) that can slide along the length of the second cable, and a ring(s) that can slide along the length of the control cable loop. The control cable loop can be used to shift the sail's positioning relatively and longitudinally with respect to the main cable loop to tack the sails back and forth across a channel or other bodies of water. In another example, the control cable loop can be used to manually raise and/or lower the aqua sails for routine maintenance of the aqua sails, storing the aqua sails, or replacing an aqua sail. In other examples, the control cable loop can be used to manually adjust the aqua sails for the natural fluctuations in the water pressure of the fluid flow, the water level of the tidal fluid flow, or the velocity of the fluid flow.

In some examples, a fifth pulley can be coupled to the control cable loop. The fifth pulley can be configured to adjust (e.g., increase and decrease) the tension of the control cable loop. In another example, the second pulley of the first cable and the fourth pulley of the second cable can be coupled to an anchored buoy disposed off of the shore of a body of water, oriented below the surface, and guyed out for stability. The anchored buoy can be configured such that the second pulley and the fourth pulley can move along the length of the anchored buoy. In another example, the second pulley and the fourth pulley can be coupled to the anchored buoy in a fixed position in relation to the anchored buoy. The anchored buoy can allow for the aqua sails of the apparatus to be deployed directly offshore. In other examples, the second pulley and the fourth pulley can be coupled to a track system on the anchored buoy that is configured to manually move or translate the second pulley and the fourth pulley along the length of the anchored buoy. In some examples, the sails can be made, through a control cable loop, to tack up and down the anchored buoy cable or back and forth from shoreward to seaward using the first and second cables.

The first sail and the second sail can include a sail mast that is fixedly coupled to the main cable loop. The sail mast can include a plurality of stabilizing fins that are coupled to a first end of the sail mast and a second end of the sail mast opposite the first end. A sail fabric can be coupled to the sail mast at the first side of the sail fabric and a flotation member can be coupled to the second side of the sail fabric opposite the first side of the sail fabric. A first sheet control cord can be coupled to the flotation member, and a sliding ring that is coupled to the main cable loop and fixed to the control cable loop. The ring can be configured to move along the length of the main cable loop as the sails catch the fluid flow. A second sheet control cord can be coupled to the flotation member and the control cable loop at a location near the sail mast. The second sheet control cord can be configured to reorient the sail's angle to a second direction (tack) when the sail is shifted by the control cable loop. In some examples, the sail fabric can have a triangular shape. In other examples, the sail fabric can have a quadrilateral shape, a diamond shape, a round shape, or a complex three dimensional shape similar to parasails or para wings.

The sail mast can include a first surface and a second surface opposite the first surface. The first surface and/or the second surface can have a rounded surface. In some examples, the sail mast can include at least one rounded edge. In another example, an edge of the mast can include micro scalloping, ridging or grooves to reduce drag. The edge can also include mechanisms or surfaces to shed debris buildup.

The bullwheel can include a mechanical actuator that is configured to move the bullwheel to increase and decrease the tension in the main cable loop. In another example, at least one of the first pulley, the second pulley, the third pulley, or the fourth pulley can be a gimbaled pulley that can be fixed to an underwater ground substrate of a body of water. In some examples, the first sail can be configured to oscillate the first cable to move between the first pulley and the second pulley when the first sail catches the flow of the tidal or ocean currents. In some examples, the second sail can be configured to oscillate the second cable to move between the third pulley and the fourth pulley when the second sail catches the flow of the river, tidal or ocean currents.

In another example, a system for converting a fluid flow of tidal current or ocean current into electrical energy can include a main cable loop and a control cable loop. The main cable loop and the control cable loop can include a first pulley, a second pulley, a third pulley, and a fourth pulley coupled to both the main cable loop and the control cable loop. The first pulley, the second pulley, the third pulley, and the fourth pulley can guide the main cable loop and the control cable loop to move in a rotational direction. An aqua sail can be coupled to the main cable loop and the control cable loop and can be configured to move the main cable loop in a rotational direction when the aqua sail catches the fluid flow of the tidal flow or ocean current. A controller can be coupled to the control cable loop that is configured to mechanically move the control cable loop in a rotational direction.

In some examples, a bullwheel can be coupled to the main cable loop. The rotational movement of the main cable loop can be transferred to the bullwheel to turn the bullwheel in a rotational direction. In some examples, a generator can be coupled to the bullwheel to convert the kinetic energy of the rotating bullwheel into another energy source, such as electrical energy.

In some examples, the sail can include a sail mast that can be fixedly attached to the main cable loop. A plurality of stabilizing fins can be coupled to a first end of the sail mast and a second end of the sail mast opposite the first end. A sail fabric can be coupled to the sail mast at a first side of the sail fabric, and a flotation member can be coupled to a second side of the sail fabric opposite the first side of the sail fabric. A first sheet control cord can be fixedly attached to the flotation member, the control cable loop, and a first ring that is coupled to the main cable loop. The first sheet control cord can be configured to control the sail's angle to the fluid flow of the river, tidal current or ocean current. The first ring can be configured to slide along the length of the main cable loop when the sail catches the fluid flow. In another example, a second sheet control cord can be fixedly attached to the flotation member, the control cable loop, and a second ring that is coupled to the main cable loop. The second ring can be configured to slide along the length of the main cable loop at a location equidistant and opposite from the sail mast as the first control cord. The second sheet control cord can be configured to reorient the sail's angle to a second direction (tack) when the first sheet control cord is shifted by the control cable loop in relation to the main cable loop. In some examples, the sail fabric can have a triangular shape, a round shape, a complex three dimensional shape, or a quadrilateral shape.

In some examples, at least one of the first pulley, the second pulley, the third pulley, or the fourth pulley can include a gimbaled pulley that can be fixed underwater to a bottom substrate of a body of water. In another example, the control cable loop can include a fifth pulley. The fifth pulley can be configured to increase or decrease the tension in the control cable loop. In another example, the bullwheel can include a mechanical actuator configured to move or translate (e.g., laterally move) the bullwheel to increase and decrease the tension in the main cable loop.

In some examples, each of the first aqua sail and second aqua sail can include a sail mast coupled to the respective cable (the first cable and the second cable). A plurality of fins can be coupled to a first end of the sail mast and a second end of the sail mast, the second end opposite the first end. A sail fabric can be coupled to the sail mast at a first side of the sail fabric and a flotation member can be coupled to an opposing second side of the sail fabric (the sail's tail). In some examples, a first sheet control cord can be coupled to the flotation member and to a ring that can move laterally along the respective cable when the sail catches the tidal fluid flow controlling the sails angle to the flow. A second control cord can be coupled to the flotation member and the respective control cable at a location equidistant and opposite from the sail mast as the first control cord.

In some examples, the sail mast includes a first surface and a second surface opposite the first surface. The first surface and/or the second surface can be or have a rounded surface(s). In some examples, an edge of the sail mast can include a rounded edge.

Example System Architecture

FIG. 1 illustrates an apparatus 100 for converting tidal flow energy into electrical energy. The apparatus 100 can include first aqua sails 102 and second aqua sails 104 that are deployed in a channel of water and below the water surface. As the tide flows into the channel, first aqua sails 102 can tack in a first direction, such as a rightward direction, and second aqua sails 104 can tack in a second direction, such as a leftward direction, opposite that of the first direction. The first aqua sails 102 are attached to first cable 106. As first aqua sails 102 tack in the first direction, the first cable 106 can be pulled in the first direction. The second aqua sails 104 are attached to second cable 108. As second aqua sails 104 tack in the second direction, the second cable 108 can be pulled in the second direction. The first cable 106 and the second cable 108 can form a continuous main cable loop 110. The main cable loop 110 can move in a rotational direction as the first aqua sails 102 and the second aqua sails 104 tack in the first direction and the second direction.

Each of the first cable 106 and second cable 108 are coupled to pulleys 112 that are fixed to the surface (e.g., bottom surface, side surface, etc.) of the channel. For example, a first pulley 112 and a second pulley 112 may be coupled to the first cable 106 at respective points of the first cable 106, the first pulley 112 and the second pulley 112 configured to guide the first cable 106 in a first rotational direction when the first cable 106 moves in the first direction. Moreover, a third pulley 112 and a fourth pulley 112 may be coupled to the second cable 108 at respective points of the second cable 108, the third pulley 112 and the fourth pulley 112 configured to guide the second cable 108 in a second rotational direction when the second cable 108 moves in the second direction. In some examples, the pulleys 112 can be anchored to a side surface of the channel beneath the water surface to guide the cables to an appropriate depth. In other examples, the pulleys 112 can be anchored to both a bottom surface of the channel and a side surface of the channel. In some examples, the pulleys 112 can be anchored to a shoreline above the water surface.

The pulleys 112 can include gimbaled pulleys that can allow the pulley to rotate freely in multiple directions. Gimbaled pulleys can include a set of pivots (not shown) that enable rotational angle of the pulley. The pulleys can reduce friction in the movement to the cable(s) that is passing through it and allow the pulleys and cable to align themselves to counteract the forces applied to them. A swiveling action of the pulley can allow the pulley to adjust its position and alignment with the direction of the main cable loop 110. This feature is particularly useful when the direction of the fluid flow and the movement of the cable loop may change. The pulleys can rotate freely, allowing the aqua sail to be adjusted accordingly without the need for manual realignment by an operator. Gimbaled pulleys can also be used to ensure efficient operation while minimizing wear and tear of the cables that pass through the pulleys.

The movement of the main cable loop 110 can be transferred to the bullwheel 114 and cause the bullwheel 114 to turn in a clockwise direction or a counterclockwise direction depending on the direction of the tidal flow and the tacking direction of the aqua sails. In some examples, the direction that the bullwheel 114 can turn depends on the direction of the movement of the respective first cable 106 and/or second cable 108. The rotational turn of the bullwheel 114 can then be transferred to a generator 116 that can convert the rotational turn of the bullwheel 114 to electrical energy through the principles of electromagnetic induction, for example. The bullwheel 114 can be connected to an axle or a shaft of the generator 116 that rotates when driven by the force of the main cable loop 110 via the bullwheel 114. The power produced by the generator 116 can be harnessed to be used for at least a portion of normal grid power demands, during power outages and/or in remote locations, such as a remote location near a shore of a body of water.

In some cases, the bullwheel 114 can include a mechanism or system (not shown) that moves or translates the position of the bullwheel 114 to increase or decrease the tension in the main cable loop 110. The tension in the main cable loop 110 can be altered to mitigate the changing water pressure and current of the fluid flow. In some cases, the tension in the main cable loop 110 can be altered to change the depth of the sails 102 and 104 in the water. For example, a decrease in the tension can bring the sails 102 and 104 closer to the surface of the water for scheduled maintenance, replacing the sails, and/or storage of the sails. In another example, an increase in the tension can lower the sails 102 and 104 within the water to a depth consistent with the deepest pulleys avoiding boats and other shipping vessels that pass by the sails.

In some cases, the apparatus 100 can include a control cable loop 118 that is attached to pulleys 112 are coupled the first cable 106 and second cable 108 with ring guides. The pulleys 112 can include a complex pulley system that can include multiple reels that can handle a cable for each reel of the complex pulley. The control cable loop 118 can include a cable controller 120 that can mechanically turn the control cable loop 118 with respect to main cable loop 110. The pulleys 112 can transfer that rotational movement to the control cable loop 118, and can alter the movement of the aqua sails 102 and 104. For example, the cable controller 120 can shift the control cable loop 118 in a short clockwise direction or short counterclockwise direction to allow the sails 102, 104 to tack back and forth across the tidal (river or ocean) current and/or the cable controller 120 can slack the control cable loop 118 (along with the main cable loop 110) to direct the aqua sails 102 and 104 closer to the water surface for routine maintenance, storage or replacement.

The cables of the main cable loop 110 and the control cable loop 118 can be designed to withstand the forces exerted by the fluid flow. The cable can be made of materials that offer high strength, low stretch, and resistance to ultraviolet (UV) degradation and abrasion. Suitable materials for the cables can include steel, metal alloys, polyester, polypropylene, nylon, poly-para-phenylene terephthalamide (PPDT), synthetic fibers, and polymers of the like. The cables may also include sections spliced with different materials depending on location, wear, and exposure. While the cables of the main cable loop 110 and the control cable loop 118 described herein are the simplest form, other examples may have multiples of these cables for each set of sails.

Figure 2:
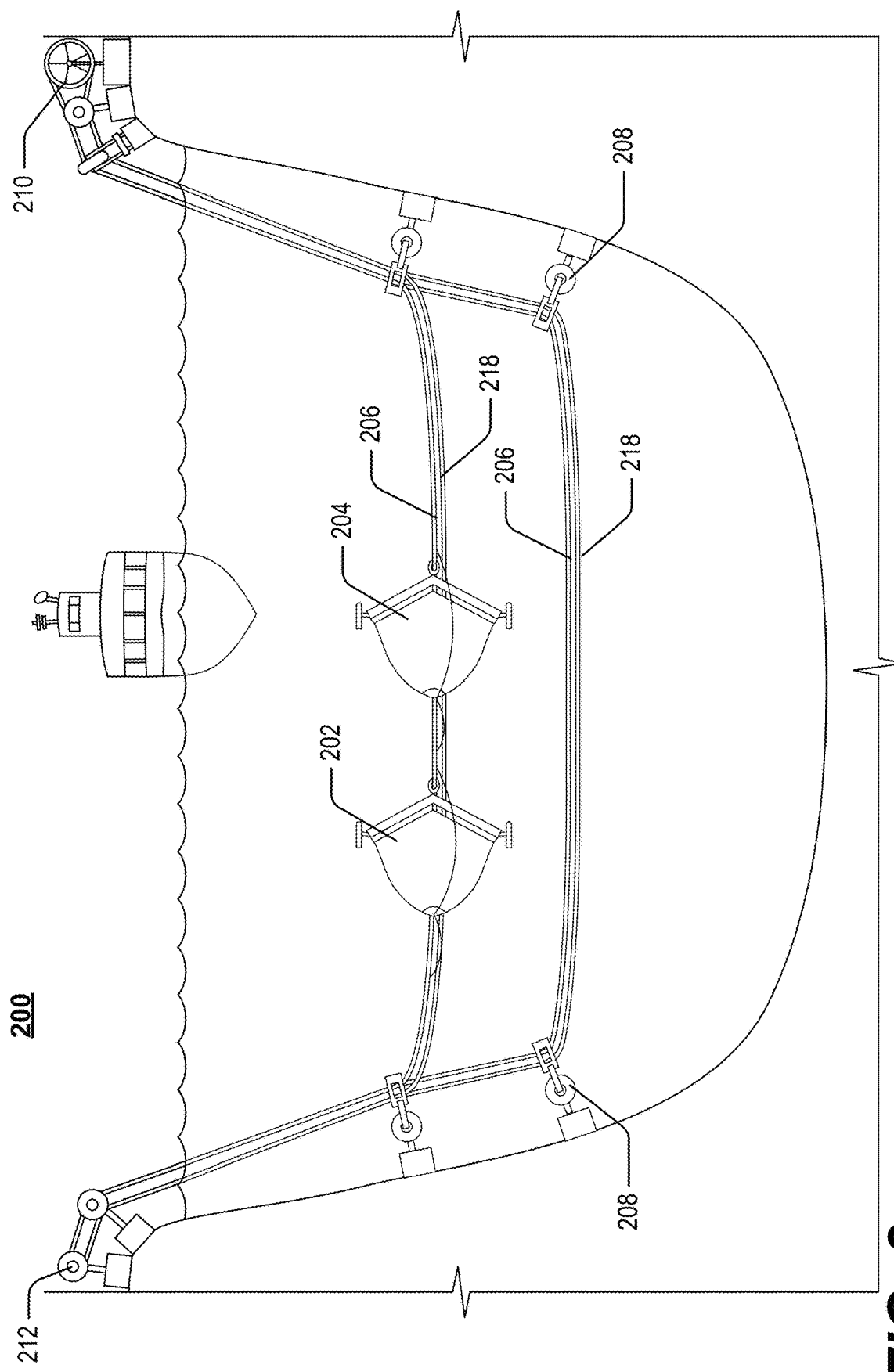
FIG. 2 illustrates a side view of a simplified apparatus for converting tidal energy into electrical energy with more details of the underwater sails. The apparatus is deployed in a channel in accordance with an example of the present disclosure. The direction of the fluid flow is the same as FIG. 1.

FIG. 2 illustrates an apparatus 200 for converting tidal fluid flow into electrical energy. The apparatus 200 can include aqua sail 202 and aqua sail 204 (and multiples of these aqua sails) that are attached to cable 206. As tidal fluid flows through the channel, the aqua sails 202 and 204 catch the fluid flow, and tack to one side of the channel. The cable 206 can be attached to gimbaled pulleys 208 that are anchored to a surface (e.g., the bottom surface of the channel, the side surface of the channel, etc.). In some examples, the gimballed pulleys 208 can be anchored to a side surface of the channel beneath the water surface. In other examples, the gimballed pulleys 208 can be anchored to both a bottom surface of the channel and a side surface of the channel. In some examples, the gimbaled pulleys 208 can be anchored to a shoreline above the water surface. The gimbaled pulleys 208 can stabilize the cable 206 in the tidal fluid flow and guide the aqua sails 202 and 204 as the aqua sails tack and move from one side of the channel to the opposite side of the channel and back again while also compensating for the bidirectional flow of tides. These gimbaled pulleys 208 and the sail tail have floats (along with other floats that may be added to create a slightly buoyant system), thereby allowing the cables and sails to float up and over each other during the slack water, and then to flip in order to orient to the opposite tidal flow as the current picks up speed.

Similar to apparatus 100 illustrated in FIG. 1, the rotational movement of the cable 206 can be transferred to a bullwheel 210 disposed on the shoreline to convert the rotational movement of the cables to electrical energy. A cable controller 212 that is coupled to a gimbaled pulley 208 can be disposed on the shoreline at the opposite side of the channel to that of the bullwheel 210. The cable controller 212 can mechanically turn the control cable 218 that is attached thereto and control the control cable 218 to alter the angle of the sails to alter the movement and tack of the aqua sails 202 and 204 as the tidal fluid flows through the channel.

The aqua sails 202 and 204 can be deployed in deep waters so that shipping vessels can pass over without obstructing the deployed aqua sails 202 and 204. In some cases, the aqua sails 202 and 204 can be deployed near the surface of the water where the water pressure is lowest and the tidal fluid flow is the highest. In other cases, the aqua sails can be deployed at deeper depths of at least 80 feet to about 150 feet where the fluid flows are lower and the water pressure is higher, thereby improving laminar flow and efficiencies across sail attack angles. In this case, the aqua sails 202 and 204 can be deployed in depths that can avoid shipping vessels as they pass over the aqua sails.

Figure 3:
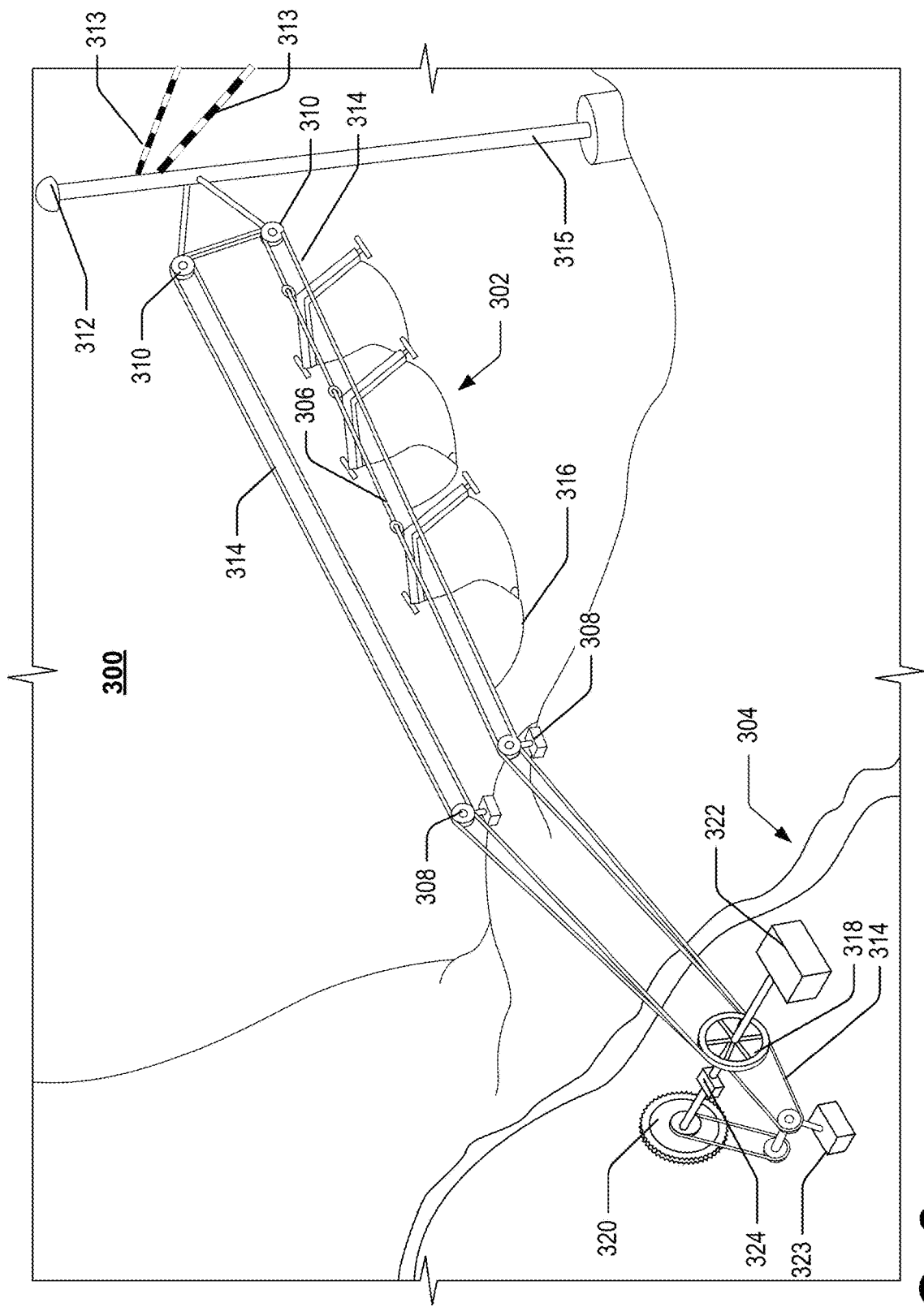
FIG. 3 illustrates a perspective view of an apparatus for converting tidal or ocean fluid flow energy into electrical energy, the apparatus deployed offshore in accordance with an example of the present disclosure. In this figure, the fluid flow is going into the page away from the viewer.

FIG. 3 illustrates an apparatus 300 for converting tidal or ocean current fluid flow into electrical energy. Apparatus 300 can include aqua sails 302 that can be deployed near a shoreline 304. The aqua sails 302 can be attached to a main cable loop 306. The main cable loop 306 can be coupled to gimbaled pulleys 308 (e.g., a first pulley 308 and a second pulley 308) near the shoreline 304 and to pulleys 310 (e.g., third pully 310 and fourth pulley 310) that are coupled to the vertical cable 315 of an anchored and guyed (guy lines 313) out surface or subsurface buoy 312. In some examples, the anchored buoy cable 315 is configured as a subsurface turnaround attachment for the third pulley 310 and the fourth pully 310, and functions as an offshore return point for the main cable loop 306 and a control cable loop 314. As the aqua sails 302 catch the tidal, river, and/or ocean fluid flow, the aqua sails 302 can tack towards the anchored buoy 312. Upon nearing the pulleys 310 that are coupled to the anchored buoy cable 315, a control cable loop 314 is reversed seaward by a variable amount that is enough to pull the sheet lines 316 on the sails 302 to the opposite side and cause the sails 302 to tack back towards the shore 304. FIG. 3 shows a controller 323 that is configured to control the control cable loop 314 in this manner. The power to change the control cable loop 314 while the sails 302 are stalled can be generated by the bullwheel 318, a flywheel 320 and a reversing trip gear 324. The movement of the aqua sails 302 can cause the main cable loop 306 to turn the bullwheel 318 of the generator 322, which can convert this movement of the bullwheel 318 into electrical energy. In some cases, the main cable loop 306 and control cable loop 314 can be mechanically turned by the bullwheel 318 so that the aqua sails 302 can be angled to the current or pulled closer to the shoreline 304 to repeat the tacking direction or to store/repair/replace the aqua sails 302. Alternatively, the main cable loop 306 and control cable loop 314 can be slackened (not shown in this diagram, see FIG. 6-614) to allow the sails 302 and cables to be pulled to the water's surface.

In some cases, the pulleys 310 that are coupled to the anchored buoy 312 can move lengthwise along (e.g., up and down) the anchored buoy cable 315 to control the depth at which the aqua sails 302 are deployed in the water. In some cases, the pulleys 310 can stabilize the aqua sails 302 as the aqua sails 302 catch the tidal fluid flows of the body of water. The anchored buoy 312 can allow for the aqua sails 302 of the apparatus 300 to be deployed directly offshore up to a range ultimately determined by the size and strength of the cables. In some examples, the pulleys 310 are coupled to the anchored buoy cable 315 in a fixed position in relation to the anchored buoy 312. In other examples, the pulleys 310 are coupled to a track system (not shown) on the anchored buoy cable 315 that is configured to manually move or translate the pulleys 310 along the length of the anchored buoy cable 315.

Figure 4:
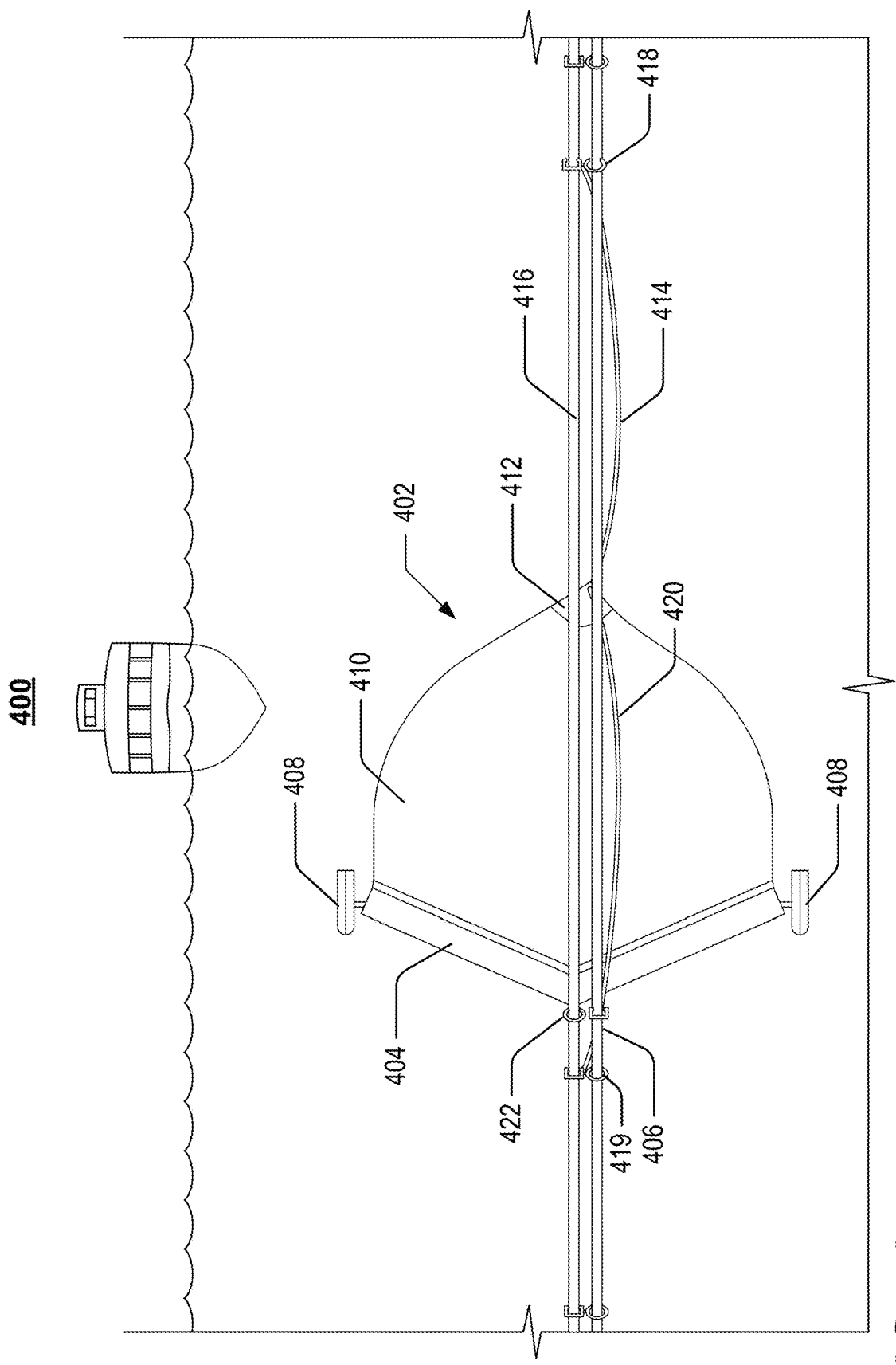
FIG. 4 illustrates a side view of an aqua sail and its cables deployed in a body of water in accordance with an example of the present disclosure. In this figure, the fluid flow is going into the page away from the viewer.

FIG. 4 illustrates a deployed aqua sail 402 of apparatus 400 The aqua sail 402 can be deployed at depths of at least about 80 feet to about 150 feet or more to avoid shipping vessels as they pass over the aqua sail 402 or to provide more tiers of sails in the same body of water. The aqua sail 402 can include a sail mast 404 that is attached to the main power cable 406. "Power," in this context, does not mean that the cable 406 conducts electricity, but that the cable 406, when moved, causes power to be generated, as described herein. Fins 408 can be attached to a top end and a bottom end of the sail mast 404. The fins 408 stabilize the deployed aqua sail 402 as the tidal water fluid flows through the channel. A sail fabric 410 that is configured to catch the fluid flow can be attached to the sail mast 404. The sail fabric 410 can be made from materials that provide good durability, UV resistance, tear resistance, and ease of maintenance. The materials for the sail fabric 410 can include polyester, nylon, carbon fiber, aramid fibers, laminates that have multiple layers of materials (such as polyester, nylon, carbon fibers, and aramid fibers), and materials of the like. Reinforcing cords can be incorporated within the body and/or at the edge of the sail fabric to convey lines of stress or control and to help shape the sail for maximum stability.

A flotation member 412 can be coupled to an end of the sail fabric 410 opposite the sail mast 404. A first sheet control cord 414 can be attached to the flotation member 412 and the control cable 416 via a ring 418 that can slide laterally along the main power cable 406 and is secured to the control cable 416. A second sheet cord 420 (in a slackened position) that is attached to the control cable 416 can also be attached to the flotation member 412 and to a sliding ring 419 guided along the main cable 406 similar to but opposite the first sheet control cord 414. The sheet control cord 420 and the slack sheet cord 414 can be the same length and are configured to tack the sail in either direction when the sail 402 catches the fluid flow. In this case, the sail 402 can be deployed to catch a maximum volume of tidal fluid flow and thereby increase the operating efficiency of the apparatus 400.

The flotation member 412 can function such that when the tidal flow slackens, and the lateral drag on the sail 402 stops or at least decreases, and the flotation member 412 buoys upwards pulling the sail 402 vertically from the end of the sail fabric 410 that is opposite the sail mast 404. As the tidal flow switches direction, the sail 402 can flip over the main power cable 406 and control cable 416. This can be facilitated by the increasing lateral drag in the opposite direction by the new tidal flow that sets up the sail's orientation for the new tidal fluid flow. The gimbaled pulleys (not shown in FIG. 4) along the cables can facilitate this rollover for both the main power cable 406 and the control cable 416.

Figure 5:
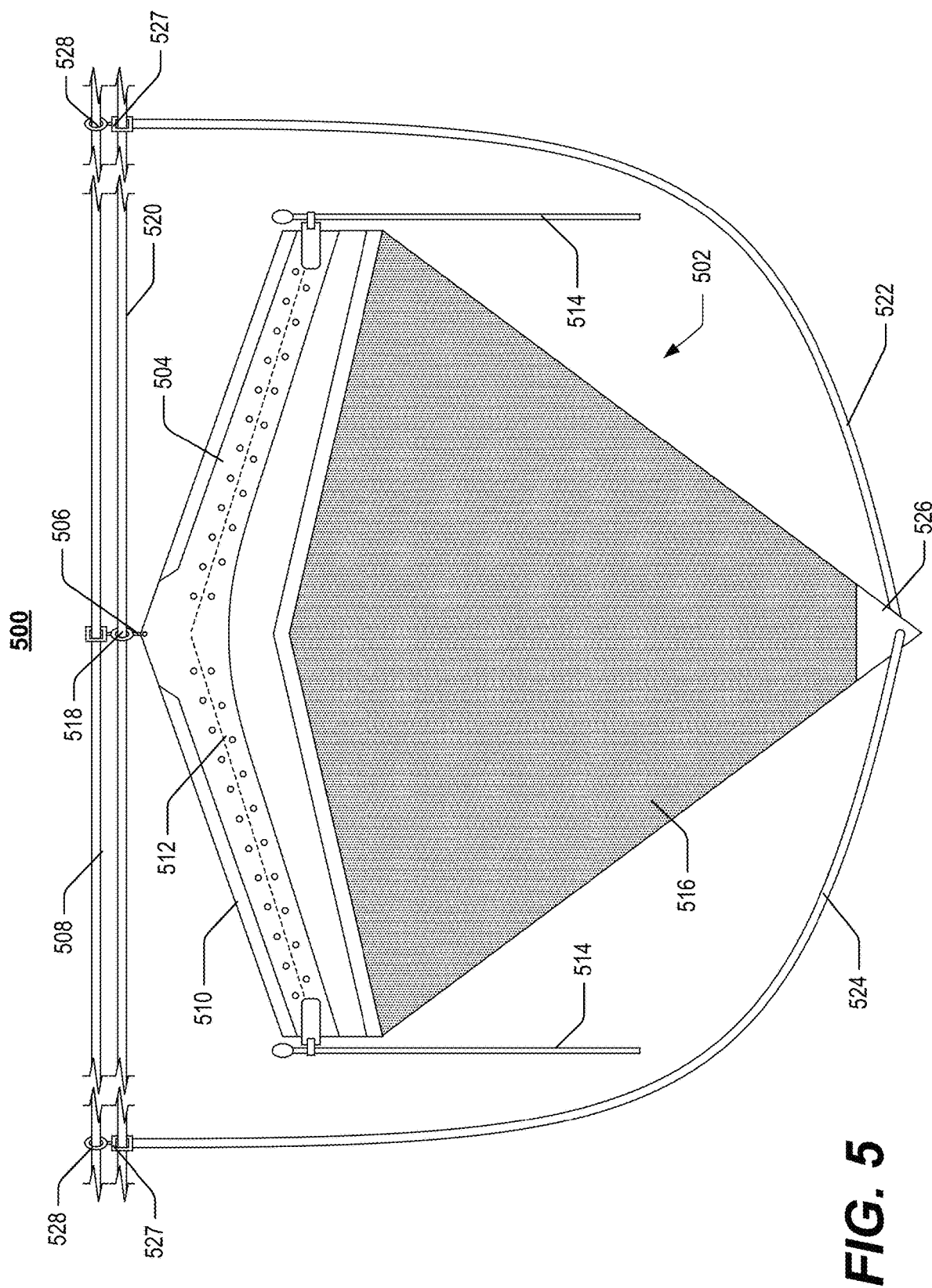
FIG. 5 illustrates a detailed side view of an aqua sail in accordance with an example of the present disclosure.

FIG. 5 illustrates an aqua sail 502 in more detail and in a non-dynamic position of an apparatus 500 for converting tidal fluid flows into electrical energy. The aqua sail 502 can include a sail mast 504 that includes an attachment 506 for securing the sail mast 504 to a main power cable 508. The sail mast 504 can include rounded edges 510 and/or contoured surfaces 512 that can reduce drag on the aqua sail 502 as the tidal fluid flows around the sail mast 504. For example, the sail mast 504 can include a first surface (e.g., left of center of the mast 504) and a second surface opposite the first surface (e.g., right of center of the mast 504), and the first surface and/or the second surface can comprise a flat or rounded surface. Fins 514 can be attached to opposing sides of the sail mast 504 that function to stabilize the deployed aqua sail 502 in the water. In some cases, the fins 514 are capable of pivoting axially in relation to the sail mast 504 in response to the direction of fluid flow that approaches the aqua sail 502. The broad blades of the fins can be parallel to a line that coincides with the center of the sail fabric 516. The fins 514 can rotate axially in relation to the sail mast 504 to trace downstream from the mast regardless of the mast's angle of attack. These fins are long and broad enough to dampen any oscillation of the sail mast with respect to the main cable (see FIG. 6-609). In further examples, these fins may also be incorporated into a more elaborate stabilizing structure with horizontal and vertical components coming around and behind the sail fabric 516.

The aqua sail 502 can include a sail fabric 516 that catches the tidal fluid flow and moves the main power cable 508 along the pulleys (not shown). The sail fabric 516 can include various shapes that can optimize the performance of the apparatus 500 in different fluid flow conditions. The sail fabric 516 shape can include a triangular shape, quadrilateral, a square shape, and a rounded shape (such as a balloon shape) or a compound three dimensional shape such as seen in parasails. In some cases, every deployed sail 502 has the same shape. In other examples, the deployed sails 502 can have different shapes.

The sail fabric 516 can be reinforced with various materials to enhance the sail fabric's strength, durability, and longevity. The sail fabric 516 can be reinforced by laminating additional layers of sail fabric at high stress areas on the sail fabric 516 such as the corners and edges of the sail fabric 516. In some cases, the sail fabric 516 can be reinforced by integrating carbon fibers or fiberglass strips into the sail fabric 516. Specific lines of stress or control can also have embedded high strength cords in the sail fabric. These cords can also help shape the sail for efficiency and dynamic stability.

The attachment 506 can be a solid connection to the main cable 508 that allows for the sail 502 to move in a pivoting motion and/or a side-to-side motion. The attachment 506 can include a ring 518 through which the control cable 520 can pass. The control cable 520 can have two control tether lines 522 and 524 that can create a fixed connection between the sail's flotation member 526 and the control cable 520. Connector 527 can connect a control tether to the main power cable 508. The connector 527 can include a ring 528 that the main power cable 508 can slide through. The shifting of the control cable 520 with respect to the main power cable 508 can pull taut one of the control tether lines 522 or 524, which shifts the sail's angle for tacking back and forth across the current.

Figure 6:
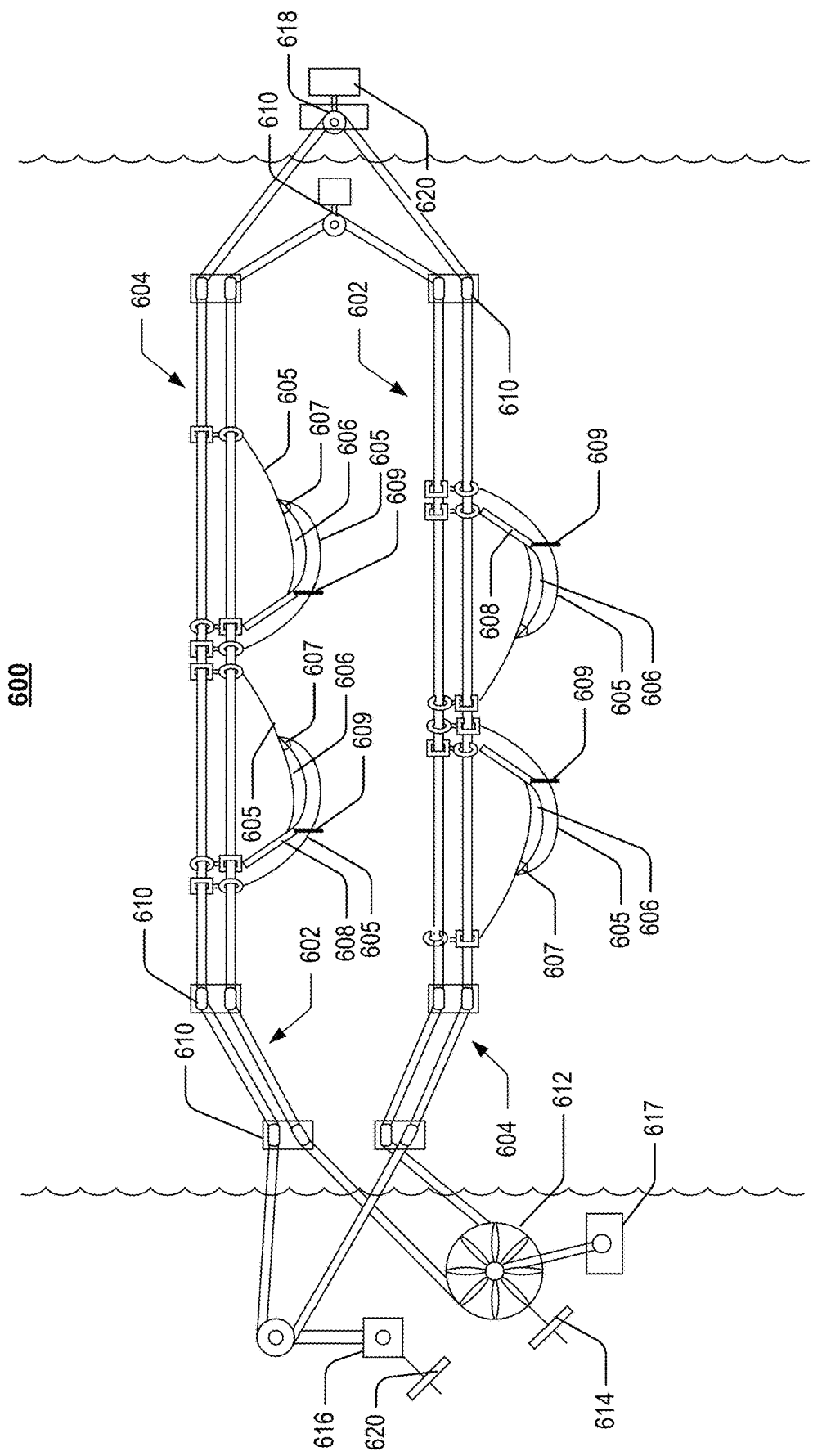
FIG. 6 illustrates a top view of a system for converting fluid flow into electrical energy, the system deployed across a body of water in accordance with an example of the present disclosure.

FIG. 6 illustrates, from a top down view, a system 600 for converting tidal flow energy into electrical energy. The system 600 can include a main cable loop 602 and a control cable loop 604. The sails 606 can be directly connected to the main cable loop 602 and the control cable loop 604 via control cords 605. The sails' masts 608 can be fixedly attached to the main cable loop 602 such that a movement of the sails 606 is transferred to the main cable loop 602. Fins 609 can project from the ends of the sail masts 608 to stabilize the aqua sails. The attachments can include a ring that the control cable loop 604 passes through. The tail ends of the sails' 606 sheet can include a float 607 that can be fixedly attached to the control cable loop 604 such that a rotational movement of the control cable loop 604 is transferred to the tail ends of the sails 606 through control cords 605. These attachments can include rings that the main cable loop 602 passes through.

The main cable loop 602 and the control cable loop 604 can be guided by pulleys 610 that are anchored to a ground substrate in the body of water. The pulleys 610 can be gimbaled pulleys that include a set of pivots (not shown) that enable rotational movement of the pulley 610. A swiveling action of the gimbaled pulleys can allow the pulley to adjust its position and alignment with the direction of the main cable loop 602 and the control cable loop 604. The gimbaled pulleys can rotate freely, allowing the sails 606 to be adjusted accordingly to the tide flow direction without the need for manual realignment by an operator.

A bullwheel 612 can be coupled to the main cable loop 602. The rotational movement of the main cable loop 602 is transferred to the bullwheel and turns the bullwheel 612 in a clockwise or counterclockwise direction. Gearing can reduce the bidirectional to unidirectional for the generator 617 and efficiency. The bullwheel 612 can include an actuator 614, such as a tension weight or a hydraulic actuator, that can adjust the tension of the main cable loop 602. In some examples, the bullwheel 612 can include more than one actuator 614. The tension in the main cable loop 602 can be altered to mitigate the changing water pressure and current of the fluid flow. In some cases, the tension in the main cable loop 602 can be altered to change the depth of the sails 606 in the water. For example, a decrease in the tension can bring the sails 606 closer to the surface of the water for scheduled maintenance, replacing the sails, and/or storage of the sails. In another example, an increase in the tension can lower the sails 606 within the water to a depth consistent with the deepest pulleys 610 that avoids boats and other shipping vessels that pass by the sails 606.

The control cable loop 604 can be coupled to a controller 616 that mechanically rotates the control cable loop 604 to pass through the controller 616 and the pulleys 610. The control cable loop 604 can include a pulley 618 that alters the tension in the control cable loop 604. A tension controller 620, such as a tension weight or hydraulic pistons, can be coupled to the pulley 618 or the controller 616 to alter the length and/or the tension in the control cable loop 604. Similar to the main cable loop 602, the tension in the control cable loop 604 can be used to mitigate the changing water pressure and current fluid flow of the body of water and to allow it to follow the main cable up or down in the water column.

During operation, the sails 606 can flip over the main cable loop 602 and control cable loop 604. This can be facilitated by first the floats 607 raising the tail ends of the sails toward the surface in the slack fluid flow then the increasing lateral drag in the opposite direction of the tidal flow that sets up the sail's 606 orientation for the new tidal fluid flow. The gimbaled pulleys, additional floats and the tension weights can facilitate this rollover for both; the main cable loop 602 and the control cable loop 604.

As will be understood by one of ordinary skill in the art, each implementation disclosed herein can comprise, consist essentially of or consist of its particular stated element, step, or component. Thus, the terms "include" or "including" should be interpreted to recite: "comprise, consist of, or consist essentially of." The transition term "comprise" or "comprises" means has, but is not limited to, and allows for the inclusion of unspecified elements, steps, ingredients, or components, even in major amounts. The transitional phrase "consisting of" excludes any element, step, ingredient or component not specified. The transition phrase "consisting essentially of" limits the scope of the implementation to the specified elements, steps, ingredients or components and to those that do not materially affect the implementation. As used herein, the term "based on" is equivalent to "based at least partly on," unless otherwise specified.

Unless otherwise indicated, all numbers expressing quantities used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques. When further clarity is required, the term "about" has the meaning reasonably ascribed to it by a person skilled in the art when used in conjunction with a stated numerical value or range, i.e. denoting somewhat more or somewhat less than the stated value or range, to within a range of ±20% of the stated value; ±19% of the stated value; ±18% of the stated value; ±17% of the stated value; ±16% of the stated value; ±15% of the stated value; ±14% of the stated value; ±13% of the stated value; ±12% of the stated value; ±11% of the stated value; ±10% of the stated value; ±9% of the stated value; ±8% of the stated value; ±7% of the stated value; ±6% of the stated value; ±5% of the stated value; ±4% of the stated value; ±3% of the stated value; ±2% of the stated value; or ±1% of the stated value.

CONCLUSION

Although the discussion above sets forth example implementations of the described techniques, other architectures may be used to implement the described functionality, and are intended to be within the scope of this disclosure. Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. An apparatus for converting kinetic energy into another form of energy, the apparatus comprising:

a first sail coupled to a first cable and disposed underwater, the first sail configured to move the first cable in a first direction when the first sail catches a water flow;

a second sail coupled to a second cable, the second sail configured to move the second cable in a second direction opposite the first direction when the second sail catches the water flow, wherein the first cable and the second cable form a main cable loop;

a first pulley and a second pulley coupled to the first cable, the first pulley and the second pulley configured to guide the first cable in a first rotational direction when the first cable moves in the first direction;

a third pulley and a fourth pulley coupled to the second cable, the third pulley and the fourth pulley configured to guide the second cable in a second rotational direction when the second cable moves in the second direction;

a bullwheel coupled to the main cable loop, the main cable loop configured to rotate the bullwheel in the first rotational direction or the second rotational direction; and a generator coupled to the bullwheel, the generator configured to convert kinetic energy from a rotation of the bullwheel into another form of energy.

2. The apparatus of claim 1, further comprising:
a control cable loop coupled to a cable controller, the first pulley, the second pulley, the third pulley, and the fourth pulley, the cable controller configured to move the control cable loop around the cable controller, the first pulley, the second, the third pulley, and the fourth pulley.

3. The apparatus of claim 2, wherein:
the first sail is fixedly attached to the first cable and the control cable loop,
the first sail is coupled to the first cable and the control cable loop via a first ring configured to move along a length of the first cable,
the second sail is fixedly attached to the second cable and the control cable loop, and
the second sail is coupled to the second cable and the control cable loop via a second ring configured to move along a length of the second cable.

4. The apparatus of claim 2, further comprising:
a fifth pulley coupled to the control cable loop, wherein the fifth pulley is configured to modify a tension in the control cable loop or shift the control cable loop bidirectionally in relation to the main cable loop rotation.

5. The apparatus of claim 2, further comprising:
a buoy coupled to an anchored buoy cable, wherein the anchored buoy cable is coupled to the third pulley and the fourth pulley,
wherein the anchored buoy cable is configured as a subsurface turnaround attachment for the third pulley and the fourth pully, and functions as an offshore return point for the main cable loop and the control cable loop.

6. The apparatus of claim 1, further comprising:
a buoy coupled to an anchored buoy cable, wherein the anchored buoy cable is coupled to the third pulley and the fourth pulley,
wherein the third pulley and the fourth pulley are configured to move along a vertical length of the anchored buoy cable.

7. The apparatus of claim 1, wherein each of the first sail and the second sail comprises:
a sail mast fixedly coupled to the main cable loop;

a plurality of fins coupled to a first end of the sail mast and second end of the sail mast opposite the first end;
a sail fabric coupled to the sail mast at a first side of the sail fabric;
a flotation member coupled to the sail fabric at a second side of the sail fabric opposite the first side;
a first sheet control cord coupled to the flotation member, the control cable loop, and a ring that is coupled to the main cable loop, wherein the ring is configured to move along a length of the main cable loop when the first sail or the second sail catches the water flow; and
a second sheet control cord coupled to the flotation member, the control cable loop, and a ring that is coupled to the main cable loop, wherein the ring is configured to move along the length of the main cable loop when the first sail or the second sail catches the water flow.

8. The apparatus of claim 7, wherein an edge of the sail mast includes micro scalloping, ridging, or grooves to reduce drag.

9. The apparatus of claim 7, wherein the sail fabric has a triangular shape, a round shape, a diamond shape, a quadrilateral shape, or a three dimensional shape.

10. The apparatus of claim 1, wherein the bullwheel is configured to modify a tension of the main cable loop.

11. The apparatus of claim 1, wherein the first rotational direction and the second rotational direction are a same rotational direction.

12. The apparatus of claim 1, wherein the first rotational direction is opposite the second rotational direction.

13. The apparatus of claim 1, wherein at least one of the first pulley, the second pulley, the third pulley, or the fourth pulley includes a gimbaled pulley configured to be fixed to a ground substrate of a body of water.

14. The apparatus of claim 1, wherein:
the first sail is configured to oscillate the first cable to move between the first pulley and the second pulley when the first sail catches the water flow, and
the second sail is configured to oscillate the second cable to move between the third pulley and the fourth pulley when the second sail catches the water flow.

15. A system for converting a water flow into electrical energy, the system, comprising:
a main cable loop;
a control cable loop, wherein a first pulley, a second pulley, a third pulley, and a fourth pulley are configured to guide the main cable loop and the control cable loop in a rotational direction;
a sail coupled to the main cable loop and the control cable loop, the sail configured to move the main cable loop in the rotational direction when the sail catches the water flow;
a controller coupled to the control cable loop, the controller configured to move the control cable loop in the rotational direction to cause an angle of the sail to change;
a bullwheel coupled to the main cable loop, wherein the main cable loop is configured to turn the bullwheel when the main cable loop moves in the rotational direction; and
a generator coupled to the bullwheel, the generator configured to convert a movement of the bullwheel into the electrical energy.

16. The system of claim 15, wherein the sail includes:
a sail mast fixedly attached to the main cable loop;
a plurality of fins coupled to a first end of the sail mast and second end of the sail mast opposite the first end, the plurality of fins being configured to stabilize the sail mast with respect to the main cable loop;

a sail fabric coupled to the sail mast at a first side of the sail fabric;

a flotation member coupled to the sail fabric at a second side of the sail fabric opposite the first side;

a first sheet control cord fixedly attached to the flotation member, the control cable loop, and a first ring that is coupled to the main cable loop, wherein the first ring is configured to slide along a length of the main cable loop when the first sheet control cord causes the sail to catch the water flow; and a second sheet control cord fixedly attached to the flotation member, the control cable loop, and a second ring that is coupled to the main cable loop, wherein the second ring is configured to slide along the length of the main cable loop when the second sheet control cord causes the sail to catch the water flow.

17. The system of claim 16, wherein the sail fabric has a triangular shape, a round shape, a diamond shape, a quadrilateral shape, or a three dimensional shape.

18. The system of claim 16, wherein the flotation member, the first pulley, the second pulley, the third pulley, and the fourth pulley are configured to allow the sail to flip over the main cable loop and the control cable loop to orient to the opposite flow of the water flow.

19. The system of claim 15, wherein at least one of the first pulley, the second pulley, the third pulley, or the fourth pulley includes a gimbaled pulley configured to be fixed to a ground substrate of a body of water.

20. The system of claim 15, further comprising a fifth pulley coupled to the control cable loop, wherein the fifth pulley is configured to modify a tension in the control cable loop.

21. The system of claim 15, wherein the bullwheel is configured to modify a tension in the main cable loop.

* * * * *